Sept. 8, 1925.  G. A. CAMPBELL  1,552,466
MEANS AND METHOD FOR MEASURING BALANCED TERMINAL CAPACITIES
Filed July 14, 1923
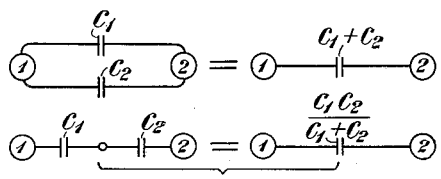
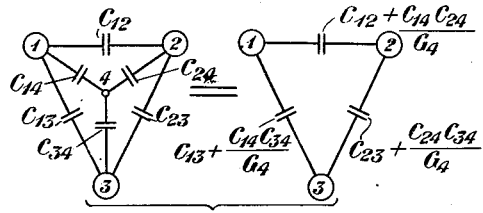
Fig. 1
Fig. 2
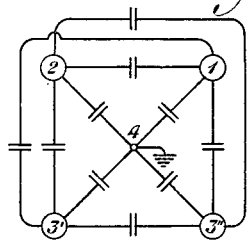
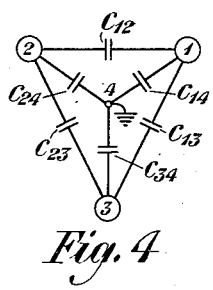
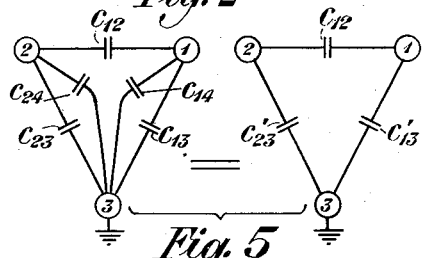
Fig. 3
Fig. 4
Fig. 5
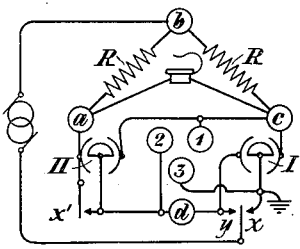
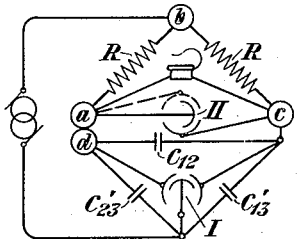
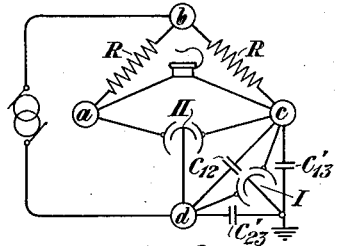
Fig. 6
Fig. 7
Fig. 8
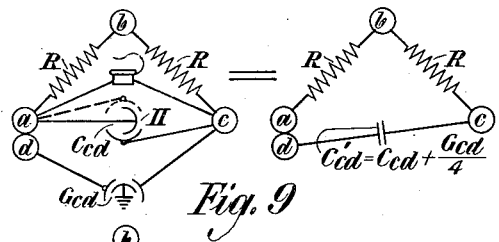
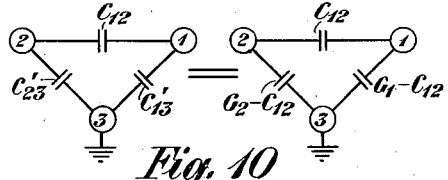
Fig. 9
Fig. 10
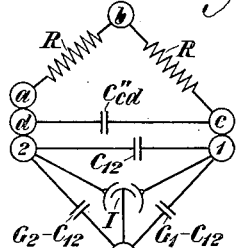
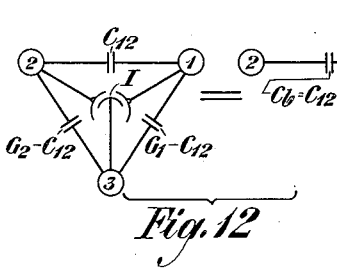
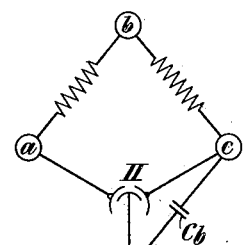
Fig. 11
Fig. 12
Fig. 13
INVENTOR
G. A. Campbell
BY
ATTORNEY Patented Sept. 8, 1925.

1,552,466

UNITED STATES PATENT OFFICE.

GEORGE A. CAMPBELL, OF UPPER MONTCLAIR, NEW JERSEY, ASSIGNOR TO AMERICAN TELEPHONE AND TELEGRAPH COMPANY, A CORPORATION OF NEW YORK.

MEANS AND METHOD FOR MEASURING BALANCED TERMINAL CAPACITIES.

Application filed July 14, 1923. Serial No. 651,588.

*To all whom it may concern:*

Be it known that I, GEORGE A. CAMPBELL, a citizen of the United States, residing at Upper Montclair, in the county of Essex and State of New Jersey, have invented certain Improvements in Means and Methods for Measuring Balanced Terminal Capacities, of which the following is a specification.

This invention relates to the measurement of capacity and more particularly to the measurement of balanced terminal capacities.

Telephone cables and other parts of the telephone plant present the problem of measuring capacities which are quite impossible to isolate but which must be measured just as they occur in association with other capacities. These associated capacities may be much larger than the particular capacities which it is necessary to accurately measure, and this renders it desirable to reduce the actual network of capacities under consideration to some equivalent network whose properties may be more readily determined.

Formerly it was the practice among telephone engineers to make so-called "mutual capacity" measurements between the conductors comprising one or more telephone circuits. Mutual capacity measurements, however, are of little value in connection with cross-talk determinations and consequently it has been more recently the practice to measure the so-called "direct capacity" thereby permitting accurate control of cross-talk and determining more completely how telephone circuits behave under all possible conditions. By the direct capacities of an electrical system is meant the capacities of a particular direct network which is equivalent to the electrical system of capacities under consideration as will be more specifically set forth hereinafter.

The balanced terminal capacity, the measurement of which forms the subject matter of the present application, may be defined as the direct capacity between two given terminals of a system of conductors with all other terminals left floating and ignored and with a hypothetical redistribution of the total direct capacity from the given pair of terminals to every third terminal which balances the two sides of the pair. The balanced terminal capacity as thus defined is equal to the direct capacity between the pair augmented by one-quarter of the grounded capacity of the pair.

In order to more fully understand the meaning of these terms and definitions and the means and methods by which the measurements are made, reference will now be had to the following detailed description read in connection with the accompanying drawing, in which Figures 1 to 5 inclusive illustrate how various systems of capacities may be reduced to simpler equivalent networks. Fig. 6 is a circuit diagram illustrating the bridge for making balanced terminal capacity measurements in accordance with the present invention. Fig. 7 is a simplified circuit showing the distribution of the capacities of the bridge during one setting thereof. Fig. 8 is a simplified diagram showing the capacity distribution during another setting of the bridge; and Figs. 9 to 13 inclusive are simplified diagrams illustrating the theory underlying the present invention.

Before proceeding with the description of the invention, it is desirable that a few fundamental principles relating to capacities be understood.

It is a familiar fact that two condensers of capacities $C_1$, $C_2$, when in parallel or in series, are equivalent to a single capacity $(C_1+C_2)$ or $C_1C_2/(C_1+C_2)$, respectively, directly connecting the two terminals. These equivalent capacities it is proposed to call direct capacities. The rules for determining them may be stated in a form having general applicability, as follows:

Rule 1. The direct capacity which is equivalent to capacities in parallel is equal to their sum.

Rule 2. The direct capacity between two terminals, which is equivalent to two capacities connecting these terminals to a concealed branch-point, is equal to the product of the two capacities divided by the total capacity terminating at the concealed branch-point, i. e., its grounded capacity.

These rules may be used to determine the direct capacities of any network of condensers, with any number of accessible terminals and any number of concealed branch-points. Thus, all concealed branch-points may be initially considered to be accessible, and they are then eliminated one after another by applying these two rules; the final result is independent of the order in which the points are taken; a network of capacities, directly connecting the accessible terminals, without concealed branch-points or capacities in parallel, is the final result.

Fig. 1 shows two elementary cases of direct capacities equivalent to capacities in parallel and capacities in series respectively. Fig. 2, on the other hand, is an illustration of a more complicated system of capacities with three terminals 1, 2 and 3 assumed to be accessible and the fourth terminal inaccessible or concealed. Thus we see that the direct capacity between the terminals 1 and 2 of the direct network shown at the right-hand side of Fig. 2, and which is equivalent to the more complicated network of capacities shown at the left, has a value $C_{12}+C_{14}C_{24}/G_4$ where $G_4$, the grounded capacity of the terminal 4, equals $C_{14}+C_{24}+C_{34}$.

Generalizing, we have the following definition:

The direct capacities of an electrical system with $n$ given accessible terminals are defined as the $n(n-1)/2$ capacities which, connected between each pair of terminals, will be the exact equivalent of the system in its external reaction upon any other electrical system with which it is associated only by conductive connections through the accessible terminals.

This definition of direct capacity presents a complete set of direct capacities as constituting an exact symmetrical realizable physical substitute for the given electrical system for all purposes. The following statements of the additive property of direct capacities show the simple manner in which direct capacities are altered under some of the most important external operations which can be made with an electrical network:

Connecting a capacity between two terminals adds that capacity to the direct capacity between these terminals, and leaves all other direct capacities unchanged. Connecting the terminals of two distinct electrical systems, in pairs, gives a system in which each direct capacity is the sum of the corresponding two direct capacities in the individual systems. Joining two terminals of a single electrical system to form a single terminal adds together the two direct capacities from the two merged terminals to any third terminal, and leaves all other direct capacities unchanged, with the exception of the direct capacity between the two merged terminals, which becomes a short circuit. Combining the terminals into any number of merged groups leaves the total direct capacity between any pair of groups unchanged, and short-circuits all direct capacities within each group.

With this understanding of the properties of direct capacities in mind, let us proceed to a consideration of the balanced terminal capacity and the measurement thereof.

Let us consider a system of four conductors, 1, 2, 3′ and 3″, as illustrated in Fig. 3. There is a capacity between each of the conductors taken in pairs and also a capacity from each conductor to ground. Representing the ground as the grounded terminal 4, the complete system involves ten capacities forming a network as illustrated in Fig. 3. In order to measure the balanced terminal capacity between two different conductors as, for example, between terminals 1 and 2 of Fig. 3, all of the remaining conductors or terminals should be connected together and grounded. If the terminals 3′ and 3″ of Fig. 3 be connected together so that they are effectively merged as the terminal 3 of Fig. 4, the capacity connecting terminals 3′ and 3″ in Fig. 3 will be in effect short-circuited and eliminated while the capacities between terminals 3′ and 4 and 3″ and 4 will be merged as the equivalent capacity $C_{34}$ of Fig. 4. Also, the capacity between terminals 2 and 3′ merges with the capacity between terminals 2 and 3″ to form the capacity $C_{23}$ of Fig. 4; likewise, the capacity in Fig. 3 between terminals 1 and 3′ merges with the capacity between terminals 1 and 3″ to form the capacity $C_{13}$ of Fig. 4. The remaining capacities of the system will be unchanged, so that the network will now assume the form indicated in Fig. 4.

If, in addition, the terminal 3 is grounded, the capacity $C_{34}$ of Fig. 4 will be short-circuited and eliminated. Since grounding the terminal 3 is, in effect, merging the ground terminal 4 of Fig. 4 with the terminal 3 of said figure, the capacities of the system are now reduced to five in number, as indicated at the left of Fig. 5, and obviously this network is equivalent to the similar network shown at the right of Fig. 5 which involves a delta arrangement of three capacities with the terminal 3 of the delta grounded. The problem of measuring the balanced terminal capacity between the terminals 1 and 2 of Fig. 3 involves the measurement of the capacity between terminals 1 and 2 of the delta arrangement at the right of Fig. 5 with the third terminal of the delta grounded. This balanced terminal capacity, as will appear later, will be found to equal the direct capacity $C_{12}$ augmented by one-fourth of the total direct capacity from the terminals 1 and 2 to ground after said terminals have been balanced to ground.

Fig. 6 illustrates the circuit arrangement of a bridge for measuring the balanced terminal capacity of a system of conductors such as illustrated in Fig. 4. The bridge comprises two resistance arms R, R connecting corners $a$—$b$ and $b$—$c$, respectively. A suitable indicating instrument such as a telephone receiver is connected between the corners $a$ and $c$ and a source of alternating current is connected to the corner $b$. The opposite terminal of the source may be connected to ground during one setting of the bridge and is adapted to be connected to the corner $d$ during another setting of the bridge. Two variable condensers I and II are employed for making the necessary balances. The three terminals 1, 2 and 3 of the network whose balanced terminal capacity is to be measured are connected so that terminal 1 is joined with corner $c$ of the bridge, terminal 2 is joined with corner $d$ and terminal 3 is grounded. Switch contacts $x$, $x'$ and $y$ are provided, the contacts $x$ and $x'$ being closed with the contact $y$ open during one setting of the bridge, while the contacts $x$ and $x'$ will be open and contact $y$ closed during the other setting of the bridge. The bridge ratio is, of course, unity, and the entire bridge is supposed to be shielded from ground with the exception of the corners $c$ and $d$ which are initially balanced to ground within the range of the condenser I as will be described later.

In making measurements to determine the balanced terminal capacity, contacts $x$ and $x'$ are closed and contact $y$ is opened. The alternating-current source is now connected to ground. One side of the adjustable condenser II is short-circuited, and the other side is connected between corners $a$ and $c$ of the bridge so as not to effect a balance thereof as indicated in Fig. 7. The connection of the three terminals 1, 2 and 3 are such that the three direct capacities of the equivalent network shown at the right in Fig. 5 will be associated with the bridge as shown in Fig. 7. Thus the direct capacity $C_{12}$ is connected between corners $a$ and $c$ of the bridge (corners $a$ and $d$ being short-circuited). Direct capacity $C_{23}'$ is connected from corner $a$ of the bridge to ground, and direct capacity $C_{13}'$ is connected from corner $c$ of the bridge to ground. The adjustable condenser I has one terminal connected to ground and its other two plates connected to terminals $a$ and $c$ respectively in parallel with the capacities $C_{23}'$ and $C_{13}'$. By adjusting the condenser I until balance is obtained, the system of capacities is so arranged that the terminals 1 and 2 are, in effect, balanced to ground.

After having obtained this balance contacts $x$ and $x'$ are opened and contact $y$ is closed. Corners $a$ and $d$ are now separated and the system of direct capacities shown at the right of Fig. 5 and balanced to ground by the condenser I is connected to corners $c$ and $d$ of the bridge by terminals 1 and 2 respectively. The source of alternating current is connected to corners $b$ and $d$ of the bridge, and the bridge is balanced by adjusting the condenser II. The resultant distribution of capacities is shown in Fig. 8. If $C_0''$ and $C_0''$ are the normal readings of the condensers I and II respectively when the bridge is balanced with the network comprising terminals 1, 2 and 3 out of circuit, the balanced terminal capacity $C_b$ and the grounded capacity unbalance $(G_2-G_1)$ of the pair of terminals 1 and 2 may be obtained in the manner above described from the readings of the condensers I and II by the following formula in which $C'$ and $C''$ are the readings with terminals 1, 2 and 3 connected in circuit:

$$C_b = 2(C'' - C_0'') \quad (1)$$
$$G_2 - G_1 = 2(C' - C_0') \quad (2)$$

The theory by which these results are attained will now be elucidated.

The bridge alone without the system of conductors involving terminals 1, 2 and 3 may be balanced as regards the condenser I in order to obtain the normal setting $C_0'$ by closing switch contacts $x$ and $x'$ with the contact $y$ open. The circuit will then assume the condition illustrated at the left in Fig. 9, it being understood that the source is connected between corner $b$ and ground. The capacity of the condenser II does not effect the balance. With the bridge thus balanced, let $C_{cd}$ and $G_{cd}$ be the direct capacity between the corners $c$ and $d$ and the total capacity between these corners and ground respectively. Since $G_{cd}$ is balanced, the effective direct capacity between the corners $c$ and $d$ when ground is ignored may be obtained in accordance with the principles illustrated in Fig. 1 as follows:

$$C'_{cd} = C_{cd} + \frac{\frac{G_{cd}}{2} \cdot \frac{G_{cd}}{2}}{G_{cd}} = C_{cd} + \frac{1}{4}G_{cd} \quad (3)$$

The bridge arrangement alone therefore reduces to the simple network shown at the right in Fig. 9.

The simplified direct network shown at the right of Fig. 5, the balanced terminal capacity of which is to be measured, is equivalent to the network shown at the right of Fig. 10, the latter network being, in effect, the same network as illustrated in Fig. 5 with the capacity between terminals 2 and 3 and the capacity between the terminals 1 and 3 defined in terms of the direct capacity $C_{12}$ and the total grounded capacities $G_1$ and $G_2$ respectively of the terminals 1 and 2. The grounded capacity of the terminal 1, for example, is (by definition previously given) the sum of all the capacities connected to said terminal, so that the expression for the capacity between terminals 1 and 3 of the network at the right of Fig. 10 may be obtained from the equation $$G_1 = C_{12} + C'_{13}. \quad (4)$$

Similarly the direct capacity between terminals 2 and 3 of the network at the right of Fig. 10 may be obtained from the equation $$G_2 = C_{12} + C'_{23}. \quad (5)$$

Fig. 11 represents the distribution of the capacities in the bridge when the equivalent direct network shown at the right of Fig. 10 is connected with the bridge and balanced by the condenser I with the switches set to produce the schematic circuit illustrated in Fig. 7. The adjustment of the condenser I to obtain a balance in Fig. 11 will result in a slight change of the normal direct capacity of the bridge taken alone, as shown at the right of Fig. 9, and accordingly the new value for this direct capacity is expressed in the diagram of Fig. 11 as $C_{cd}''$. This direct capacity is connected, in effect, between corners $a$ and $c$ of the bridge and consequently does not affect the balancing of the circuit of Fig. 11. From Fig. 11 it will be apparent that if $C'$ represents the setting of the condenser I when the circuit is balanced, the following equation obtains:

$$G_1 - C_{12} + (C' - C_0') = G_2 - C_{12} - (C' - C_0') \quad (6)$$

This reduces to:

$$G_2 - G_1 = 2(C' - C_0') \quad (7)$$

which is equation 2 above given.

Considering now the network involving terminals 1, 2 and 3 with the associated direct capacities and with the condenser I adjusted to obtain a balance to ground, the distribution of capacities will be as indicated at the left in Fig. 12. Following the principles illustrated in Fig. 9 and in connection with the formula 3, this network may be reduced to a simple direct capacity $C_b$, connecting terminals 1 and 2 and having the value $$C_b = C_{12} + \frac{1}{4}G_{12} \quad (8)$$

in which $G_{12}$ is the total direct capacity to ground of the conductors 1 and 2. The factor $G_{12}$ may be otherwise expressed as the sum of all of the capacities connected to terminal 3 in the diagram at the left of Fig. 12. Hence $G_{12}$ has the following value:

$$G_{12} = G_1 - C_{12} + (C' - C_0') + G_2 - C_{12} - (C' - C_0') = G_1 + G_2 - 2C_{12} \quad (9)$$

From equations (8) and (9) it is apparent that $G_{12}$ and hence $C_b$ is independent of the value of condenser I when conductors 1 and 2 are balanced to ground.

The direct capacity $C_b$ interconnecting terminals 1 and 2, as shown at the right of Fig. 12, is equivalent to the balanced terminal capacity whose value is to be determined and hence, if this equivalent capacity be connected between corners $c$ and $d$ of the bridge by opening contacts $x$ and $x'$ and closing contact $y$ in Fig. 6, the resultant circuit which is illustrated in Fig. 8 may be simplified to the arrangement shown in Fig. 13, which clearly indicates that the desired capacity measurement may be obtained by adjusting the condenser II. If $C''$ represents the setting of the condenser II for the balance of the bridge under the conditions shown in Fig. 13, it will be apparent from Fig. 13 that the following relation obtains:

$$C'' - C_0'' = C_b - (C'' - C_0''). \quad (10)$$

This reduces to $$C_b = 2(C'' - C_0''). \quad (11)$$

which is equation 1 already given.

Any failure to adjust the condenser I to perfectly balance the pair of terminals 1—2 will decrease the measured capacity $C_b$ as will be made clear later. This fact may be utilized to measure the balanced terminal capacity by using only the second bridge adjustment, i. e., with the contacts $x$ and $x'$ open and contact $y$ closed. The measurement is accomplished by adjusting the condenser I so as to make the reading $C''$ of condenser II a maximum with the circuit in the condition illustrated in Fig. 8.

In order to understand how the unbalance of the condenser I decreases the measured capacity $C_b$, let us consider the circuit combination illustrated at the left of Fig. 12. From equation 8 it is clear that the capacity $C_b$ may be expressed in terms of the fixed capacity $C_{12}$ and a variable function of the capacity $G_{12}$. It is also clear from equation 9 that the capacity $G_{12}$ is the algebraic sum of all the capacities connected to the point 3. This being the case, we may designate the capacity between terminals 2 and 3 as $xG_{12}$ and the capacity connecting terminals 1 and 3 as $(l-x)G_{12}$. The capacity $C_b$ may then be written:

$$C_b = C_{12} + \frac{xG_{12}(l-x)G_{12}}{xG_{12} + (l-x)G_{12}} = C_{12} + x(l-x)G_{12} \quad (12)$$

Now from equation 12 it is apparent that the variable function which depends upon the adjustment of the condenser I in Fig. 12 is the coefficient $x(l-x)$. This expression is a maximum when $x=l-x=\frac{1}{2}$, which is the condition of balance. Consequently, from equation 12, $C_b$ will be a maximum when there is a balance between terminals 1—2 and ground.

It will now be clear that the procedure for obtaining the value of the capacity $C_b$ without the preliminary operation of balancing the terminals 1—2 to ground will be quite simple. Assuming that the contacts $x$ and $x'$ are open and contact $y$ closed so that the circuit is in the condition indicated in Fig. 8, the condenser I may be set at any arbitrary point regardless of balance to ground, and the condenser II will then be adjusted until the bridge is balanced. If, when the bridge is balanced, the setting of the condenser I is such that there is a certain amount of unbalance to ground, it is at once apparent that the bridge may be balanced without changing the setting of the condenser II by adjusting the condenser I to a position such that the terminals 1—2 will be unbalanced to ground in the opposite direction. Having found this second setting for the condenser I, condenser I is set to a reading midway between the two previous settings, and condenser II again adjusted until a balance is obtained. This final setting of the condenser II will be the maximum setting for this condenser, since the correct setting for condenser I to obtain this maximum will obviously lie midway between the two possible settings of the condenser I which will give a balance with any given setting of condenser II. Accordingly, the final setting of condenser II will give the same value for the balanced terminal capacity as that obtained by the method first described. It should be noted in passing that the setting $C''$ of the condenser II is not sensitive to small deviations from a true balance in the setting of the condenser I.

Balanced terminal capacity is of practical importance as a measure of the transmission efficiency to be expected from a metallic circuit if it is subsequently transposed so as to balance it to every other conductor. In practice, when the unbalance of the section of open wire or cable pair which is being measured is relatively small, it is sufficient to set the condenser I once for all to balance the bridge itself and ignore the unbalance of the pair. This favors the unbalanced pair, however, by the amount $$\frac{1}{4}(G_2 - G_1)^2/(G_{12}' + G_{cd})$$

where $(G_{12}'+G_{cd})$ is the grounded capacity of the pair augmented by that of the bridge. That the above expression gives the deviation from the correct result will be apparent from the following considerations. It is a known rule that two capacities in series may be replaced by their product divided by their sum. This value is equivalent to one-quarter of the sum minus the square of the difference divided by four times the sum. To illustrate the equivalence of the two rules, let us take two capacities $C_1$ and $C_2$ in parallel. Substituting these values in the expression for the equivalent capacity as given by the second rule, we have $$\frac{C_1+C_2}{4} - \frac{(C_1-C_2)^2}{4(C_1+C_2)} = \frac{(C_1+C_2)^2}{4(C_1+C_2)} - \frac{(C_1-C_2)^2}{4(C_1+C_2)} = \frac{C_1 C_2}{C_1+C_2} \quad (13)$$

From equation 13 it is apparent that the expression obtained by applying the second rule reduces to the expression obtained in accordance with the first rule. The advantage of using the expression at the right of equation 13 is that it gives the equivalent capacity in terms of the sums and differences of the capacity components and does not involve any product term.

Since $G_{cd}$ and $G_{12}'$ are the grounded capacities of the bridge and the pair respectively, $G_2-G_1$ may be taken as the difference in the capacities to ground from terminals 1 and 2 while the total direct capacity from the two terminals to ground is $G_{12}'+G_{cd}$. Substituting these two values in the right-hand term of equation 13, we obtain the following expression for the total capacity interconnecting terminals 1 and 2 through the grounded terminal 3 in Fig. 12:

$$\frac{G_{12}'+G_{cd}}{4} - \frac{(G_2-G_1)^2}{4(G_{12}'+G_{cd})} \quad (14)$$

When the balance is exact it is obvious that $G_2-G_1=0$ and the above expression at once reduces to $\frac{1}{4}(G_{12}'+G_{cd})$. Since $G_{12}$ is by definition the sum of all the capacities connected to the grounded terminal 3 in Fig. 12 and since $G_{12}'+G_{cd}$ is also by definition the sum of all the capacities connected to terminal 3 of Fig. 12, it is at once apparent that $$\frac{1}{4}(G_{12}'+G_{cd}) = \frac{1}{4}G_{12} \quad (15)$$

Comparing expression 14 with equations 15 and 8, it is at once apparent that, as above stated, $\frac{1}{4}(G_2-G_1)^2/(G_{12}'+G_{cd})$ represents the factor of error due to a slight unbalance of the terminals 1—2 to ground.

It will be obvious that the general principles herein disclosed may be embodied in other organizations widely different from those illustrated without departing from the spirit of the invention as defined in the following claims:

What is claimed is:

1. The method of determining the balanced terminal capacity of two of a group of conductors in capacitative relation to each other, which consists in joining together and connecting to ground all of the conductors except the two whose capacity is to be measured, equalizing the capacity between each of said two conductors and ground and then measuring the equivalent direct capacity between the two conductors with the remaining conductors grounded and the capacities thus equalized.

2. The method of determining the balanced terminal capacity of two of a system of conductors in capacitative relation to each other by means of a Wheatstone bridge circuit including an alternating source of potential adapted to be connected to two of its corners and an indicating instrument connected to neutral corners of the bridge, which consists in connecting together and to ground all of the conductors except the two between which the measurement is to be made, connecting said two conductors to the neutral corner of the bridge, connecting said source between a third corner of the bridge and ground, balancing the bridge by adjusting the capacity between the two neutral corners and ground, connecting the two conductors whose capacity is to be measured to form a leg of the bridge between one of the neutral corners and a corner connected to the source with the capacity of the conductors to ground, remaining balanced in accordance with the previous adjustment and then adjusting the standard capacity element connected between the other neutral point of the bridge and said source until the bridge is balanced.

3. The method of determining the balanced terminal capacity between two conductors of a system of conductors arranged in capacitative relation to each other by means of a Wheatstone bridge arrangement comprising four corners between two of which an alternating current source may be connected and between the other two of which an indicating instrument may be connected having two fixed arms between each of said last two corners and one of the corners to which the source is connected and also provided with two standard adjustable condensers, which consists in connecting together and to ground all of the conductors except the two between which the capacity measurement is to be made, connecting said two conductors to corners of the bridge to form a third arm of the bridge, connecting one of the terminals of one of the standard condensers to ground and its other two terminals to the same corners of the bridge as said two conductors and connecting the other standard condenser between two corners of the bridge to form a fourth arm thereof, with the two condensers so adjusted that the reading of the latter condenser will be a maximum.

4. A circuit for measuring the balanced terminal capacity of two of a system of conductors arranged in capacitative relation to each other, said circuit comprising a Wheatstone bridge arrangement having two fixed arms, a source of alternating current and an indicating instrument, said source being connected to the corner constituting the junction point of said fixed arms, and said indicating instrument being connected to the corners comprising the other terminals of said fixed arms, means for joining together and to ground all of the conductors except the two whose capacity is to be measured, means for equalizing the capacity between the said two conductors and ground, means for connecting said two conductors with the capacity to ground thus equalized to form a third arm of the bridge and a standard capacity forming the fourth arm of the bridge, said standard being adjusted to balance the bridge.

5. A circuit for measuring the balanced terminal capacity of two of a system of conductors arranged in capacitative relation to each other, which comprises a Wheatstone bridge having two fixed arms, a source of alternating current connected to a corner of the bridge comprising the junction point of said arms, an indicating instrument connected to the corners of the bridge comprising the opposite terminals of said fixed arms, means to connect together and to ground all of the conductors of said system except the two whose capacity is to be measured, means to connect said two conductors to the neutral corners of said bridge with said alternating current source connected to ground, means to balance the bridge as thus set up so that the capacity between the said two conductors and ground will be equalized, means to connect said two conductors with their effective capacities to ground thus equalized in such a manner as to form a third arm of the bridge and a standard capacity element forming the fourth arm of the bridge, said standard capacity element being adjustable to balance the bridge.

6. A circuit for measuring the balanced terminal capacity of two of a system of conductors arranged in capacitative relation to each other, said system comprising a Wheatstone bridge arrangement having two fixed arms, a source of alternating potential connected to a corner of the bridge comprising the junction point of said fixed arms and to the opposite corner of the bridge an indicating instrument connected between the corners of the bridge comprising the other terminals of said fixed arms, means to connect the two conductors whose capacity is to be measured to form a fourth arm of the bridge with the remaining conductors connected together and to ground, an adjustable standard condenser having one terminal connected to ground and its other two terminals connected to said two conductors, an adjustable standard condenser forming the fourth arm of the bridge, said standard condensers being adjustable so that the reading of said last mentioned condenser will be a maximum with the bridge balanced.

In testimony whereof I have signed my name to this specification this 13th day of July, 1923.

GEORGE A. CAMPBELL.